(12) United States Patent
Coudrais (10) Patent No.: US 6,641,093 B2
(45) Date of Patent: Nov. 4, 2003

(54) CLIP ARRANGEMENT FOR RELEASABLY FASTENING AN OBJECT TO AT LEAST ONE LINE

(75) Inventor: Thierry Coudrais, Bonneuil sur Marne (FR)

(73) Assignee: Newfrey LLC, Newark, DE (US)

( * ) Notice: Subject to any disclaimer, the term of this patent is extended or adjusted under 35 U.S.C. 154(b) by 0 days.

(21) Appl. No.: 09/989,853

(22) Filed: Nov. 20, 2001

(65) Prior Publication Data

US 2002/0063189 A1 May 30, 2002

(30) Foreign Application Priority Data

Nov. 24, 2000 (DE) .......................................... 100 58 528

(51) Int. Cl.[7] ................................................. F16L 3/00
(52) U.S. Cl. .......................... 248/73; 248/68.1; 248/71; 248/74.2; 248/74.4
(58) Field of Search .................... 248/73, 68.1, 71, 248/74.2, 74.4, 916, 903

(56) References Cited

U.S. PATENT DOCUMENTS

| | | | | |
|---|---|---|---|---|
| 3,551,963 A | * | 1/1971 | Mosher .................... 24/216 |
| 3,807,675 A | * | 4/1974 | Seckerson .................... 248/73 |
| 3,894,706 A | * | 7/1975 | Mizusawa .................... 248/68 |
| 4,450,605 A | | 5/1984 | Schaty |
| 4,811,922 A | * | 3/1989 | Yoneyama .................... 248/73 |
| 4,971,279 A | * | 11/1990 | Huerre ...................... 248/74.2 |
| 5,039,040 A | * | 8/1991 | Idjuakiren .................... 248/73 |
| 5,058,838 A | * | 10/1991 | Velke .......................... 248/50 |
| 5,129,607 A | * | 7/1992 | Satoh .......................... 248/73 |
| 5,547,064 A | | 8/1996 | Meyer et al. |
| 5,588,683 A | | 12/1996 | Schliessner |
| 5,988,678 A | * | 11/1999 | Nakamura .................. 280/751 |
| 6,371,419 B1 | * | 4/2002 | Ohnuki ...................... 248/74.2 |
| 6,416,244 B1 | * | 7/2002 | Huber ........................ 403/277 |
| 6,443,402 B1 | * | 9/2002 | Ferrill et al. .................. 248/65 |

* cited by examiner

Primary Examiner—Leslie A. Braun
Assistant Examiner—Amy J. Sterling
(74) Attorney, Agent, or Firm—Edward D. Murphy (57) ABSTRACT

A clip arrangement is described for releasably fastening an object (1) to at least one line (2) with a clamping part (4) which can be snapped onto the line (2) and a retaining part (3) to releasably fasten the object (1) between the retaining part (3) and clamping part (4). This allows valuable and simple fastening of an object to at least one line, high tensile strength being combined with simple releasability of the connection.

11 Claims, 6 Drawing Sheets

CLIP ARRANGEMENT FOR RELEASABLY FASTENING AN OBJECT TO AT LEAST ONE LINE

BACKGROUND OF THE INVENTION

The invention relates to a clip arrangement for releasably fastening an object to at least one line.

It is known to use clips, in particular made of plastics material, to fasten elongate articles, for example pipes, lines or cables, to a support or to a wall. Clips of this type are used, in particular, for fitting fuel lines, brake lines or electric lines. Clips of this type are used in large numbers in automotive engineering. Numerous embodiments of clips of this type are described, for example in U.S. Pat. No. 5,547,064 or U.S. Pat. No. 4,450,605.

Depending on the type of mechanical tensile strength desired of the fastening, the lines are partially or completely surrounded by structures of the clips, wherein clips in particular which can be subjected to tensile loads usually have the property that they can only be released with difficulty, and easily releasable clips usually have the property of having relatively low tensile strength.

To fasten an object to a support, a particular structure is needed on the support, such as, for example, a stud or a hole, so additional stages of operation are usually necessary to fit an object to a support.

SUMMARY OF THE PRESENT INVENTION

The object of the present invention is consequently to provide a device for fastening an object on an already fastened strip, allowing, on the one hand, simple fastening of the object and, on the other hand, high mechanical tensile strength in connection with simple releasability of the object. Moreover, the line itself should not be damaged during frequent fastening and release of the object.

The clip arrangement according to the invention for releasably fastening an object to at least one elongate article, in particular a line, has a clamping part which can be snapped onto the line, and a retaining part for releasably fastening the object between the retaining part and clamping part. Releasable fastening of an object in a simple manner is possible with this clip arrangement as the object is fastened directly onto the line and additional structures such as a hole or a stud become superfluous. By fitting a rigid clamping part onto the line, a high degree of positioning precision is achieved even with frequent release and fastening of the object. Moreover, with this clip arrangement it is indirectly possible to releasably fasten the object in a simple manner to the support on which the line is fixed.

In a further development of the invention, the line may be termed a utility line, such as an electric line, a fuel line, a brake line or the like. Lines of this type are to be found at many points, for example in vehicles, and can therefore be used to fasten further objects.

In a further embodiment of the clip arrangement, the clamping part has fastening structures adapted to the line cross-section. Secure fixing of the clamping part on the line is ensured with these fastening structures and positioning precision is increased. A multiplicity of structures are possible as fastening structures, as described, for example in U.S. Pat. No. 5,588,683. One or more lines with identical or different cross-sections can thus be used as a retaining device by means of corresponding fastening structures on the same clamping part.

In an advantageous development of the invention, the clamping part has damping structures which reduce the transmission of mechanical oscillations between the line and object. Both the transmission of oscillations of the line to the object and the transmission of oscillations of the object to the line is weakened. This is achieved in that the damping structures contain flexible elements that are capable of elastically absorbing relative movements between the line and object.

In a further advantageous development of the invention, the clamping part is rotatably connected to the retaining part, latching means being provided at predetermined relative angular positions. The rotatable connection allows a twist lock with which release and fastening of the object can be executed. The rotatable connection can be, on the one hand, an articulated joint, in which two or more parts mesh, but can also be a flexible connection, in which one element elastically absorbs a rotation. In the flexible connection, at least one portion is manufactured from flexible material, for example soft plastics material. The latching means provide firmly latching relative angular positions between the clamping part and retaining part and prevent unintentional rotations of the twist lock and therefore undesired release of the fastening.

In a further embodiment of the invention, the latching means have at least one spring element which is secured against its spring loading when rotation occurs. The spring element presses into a cavity in an appropriate manner for latching.

The latching means are provided on the clamping part and the retaining part in one embodiment of the invention and on the retaining part and the object in a further embodiment of the invention. The means always consist of at least two cooperating structures. One is, for example, a resilient pin and the other is a structure having a cavity or an elevation.

According to an advantageous embodiment of the invention, on the clamping part there is a journal socket into which a journal of the retaining part can be inserted. Alternatively, there is a journal available on the clamping part that can be inserted into a journal socket on the retaining part. As a result, a connection between the clamping part and retaining part is achieved.

According to a further development according to the invention, the journal and/or the journal socket have a barbed structure which cooperates with the respective counter-structure in such a way that a connection which is easy to assemble and is thereafter tension-resistant if produced between the clamping part and the retaining part.

In a still further development of the invention, latching means are fitted to the journal, in that the journal is at least partially non-circular in cross-sectional design, but preferably in the manner of a polygon, in particular a square. As a result of the cross-section of the journal deviating from a circular shape, cavities and elevations are effectively formed which allow latching of resilient counter-structures of the journal socket at predetermined relative angular positions of the retaining part and clamping part. In this process, squares are only a sub-class of all shapes that are non-circular. Other shapes, for example oval shapes or truncated circular shapes fulfill the same purpose.

In a particularly preferred further development, the cross-section of the journal is a square with beads on the respective corners. As a result, the latching function is improved and wear at the corners is avoided when the journal is frequently turned in the journal socket. Increased security against automatic release of the fastening even after frequent actuation is thus achieved.

In a special embodiment of the invention, the journal, at its upper end, has a collar which projects everywhere radially, on the bottom of which a barbed structure of the journal socket is supported once the journal has been inserted. The barbed structure allows, in this way, retention of the journal secured against falling out. The barbed structure, preferably formed from obliquely positioned finger-like barbs, simultaneously serves as a resilient structure for latching on the cavities of the journal, which is not round.

In an advantageous embodiment of the invention, the clamping part and the retaining part are permanently connected by a two-component injection moulding method, but are produced movably with respect to one another. This method has the advantage that the clamping part and retaining part can be produced as a two-membered coherent part in a production line, so a stage of later assembly is dispensed with.

In a preferred embodiment of the clip arrangement according to the invention, the object to be fastened has a non-circular opening, in particular a narrow slot, and the retaining part a non-circular projection so the projection can be inserted through the opening and locks the object and fixes it in at least one predetermined angular position between the object and retaining part. As a result, a connection is obtained between the retaining part and object that can be released again and can be produced by rotating the retaining part.

In a particular embodiment of the clip arrangement according to the invention, the object is fastened with elastic deformation of the clamping part and/or the retaining part, in that the spacing between the clamping part and retaining part, at least in partial regions, is smaller than the thickness of the object. As a result of the elastic deformation of the clamping part and/or the retaining part, loose fastening of the object is avoided. Moreover, friction is increased during rotation of the retaining part relative to the clamping part or to the object. This, in turn, results in increased security against automatic release of the fastening.

In a further embodiment of the invention, the projection has a handle with which the journal can be turned. As a result of the handle, the fastening can be produced or released manually in a simple manner.

In a particular embodiment of the invention, the projection has reinforcing structures which ensure that the retaining part can absorb the tensile loads and torques. In a still further special embodiment of the invention, the clamping part and/or retaining part or the retaining part and/or the object have friction structures which make unintentional release of the fastening by automatic rotation difficult.

In a preferred embodiment of the invention, the object is a protective covering for the line or a housing part for another component near the line. As a result of the protective covering or the housing part, the line as such, but also surrounding parts, can be protected from external influences. In an advantageous embodiment of the invention, the object is an electrical component and/or a housing thereof.

In a still further advantageous development, the object is fastened to a plurality of lines, in that the clamping part has sockets for a multiplicity of approximately parallel lines, so increased stability of the object is achieved.

Further advantageous embodiments and details of the invention are described by means of embodiments shown with the aid of the drawings. The invention is, however, not limited hereto, as numerous amendments, in particular of the special structures and geometry of the clip, are possible without changing the essential content of the invention.

BRIEF DESCRIPTION OF THE ACCOMPANYING DRAWINGS

These are schematic drawings, in which.

DETAILED DESCRIPTION OF THE INVENTION

FIG. 1 through FIG. 4 show various perspective views of a clip arrangement according to the present invention with which an object 1 is fastened to two lines 2. The line 2 can be any suitable utility line, such as an electric line, a fuel line, a brake line or the like.

Figure 1:
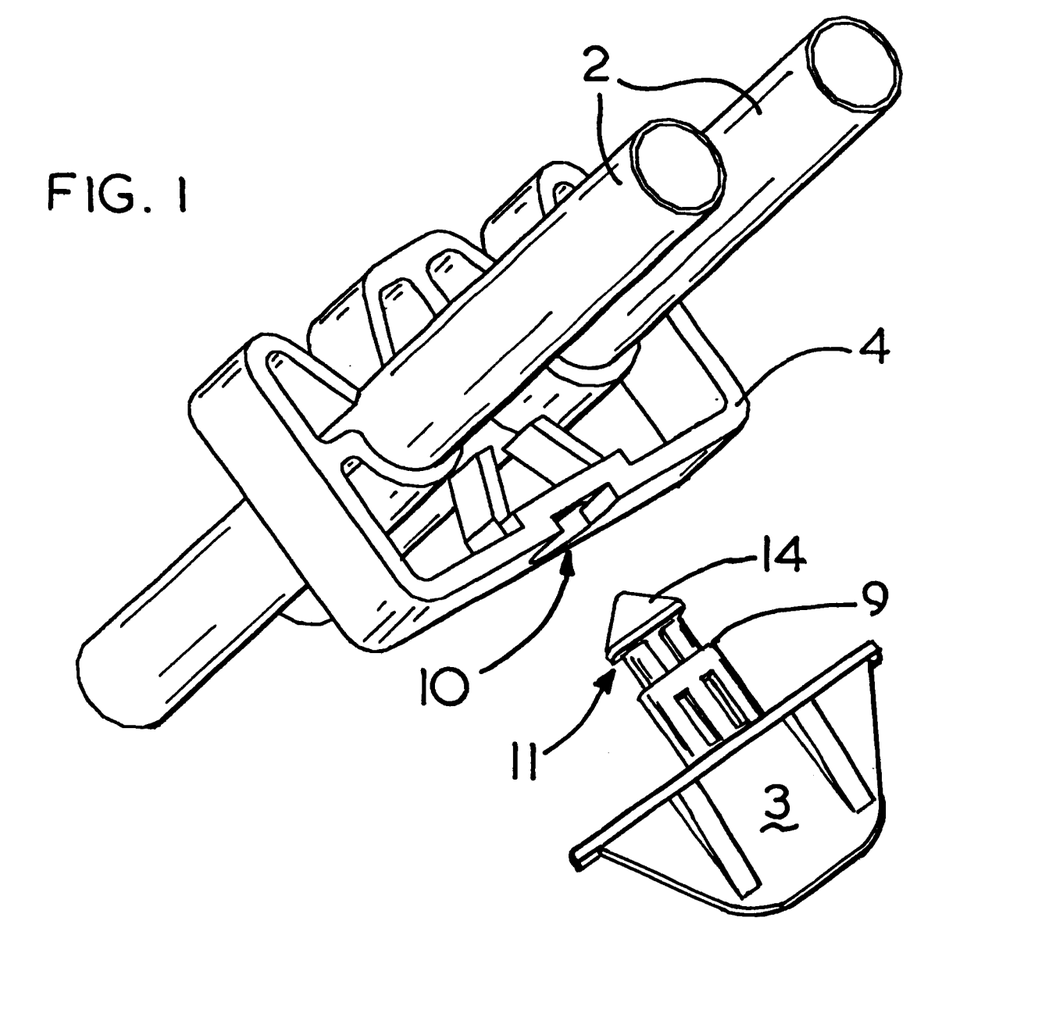
FIG. 1 is an exploded perspective view of the clip arrangement of the present invention showing the two lines connected thereto.

FIG. 1 shows a clamping part 4 which is fastened to two lines 2 and a retaining part 3 which is not yet inserted into a journal socket 10 with a journal 9.

Figure 2:
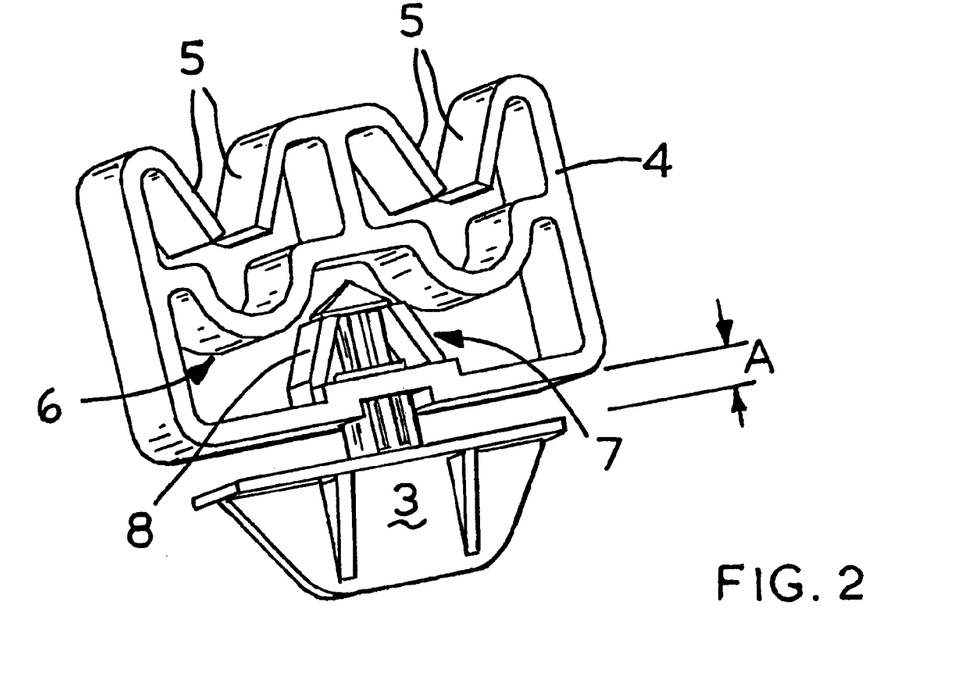
FIG. 2 is a perspective view of the clip arrangement of the present invention.

FIG. 2 shows the retaining part 3 inserted into the clamping part 4. The clamping part 4 can easily be snapped onto the lines 2 with the fastening structures 5. The barb-like design of the fastening structures 5 leads, in this case, to permanent retention with tensile strength. Damping structures 6 reduce the transmission of vibrations either from the lines 2 to an object 1 fastened with a clip arrangement or conversely from the object 1 to the lines 2. With the aid of finger-like spring elements 8 which act on the bottom 11 of a collar 14, the retaining part 3 is fastened on the clamping part 4, so a tension-resistant connection is produced between the clamping part 4 and retaining part 3. Latching means 7 which cooperate with the finger-like spring elements 8 provide at least one firmly latchable relative angular position between clamping part 4 and retaining part 3.

A projection 16 of the retaining part 3, which is flat in design, is inserted through an opening 15, which is slot-shaped in design, of the object 1 to be fastened.

Figure 4:
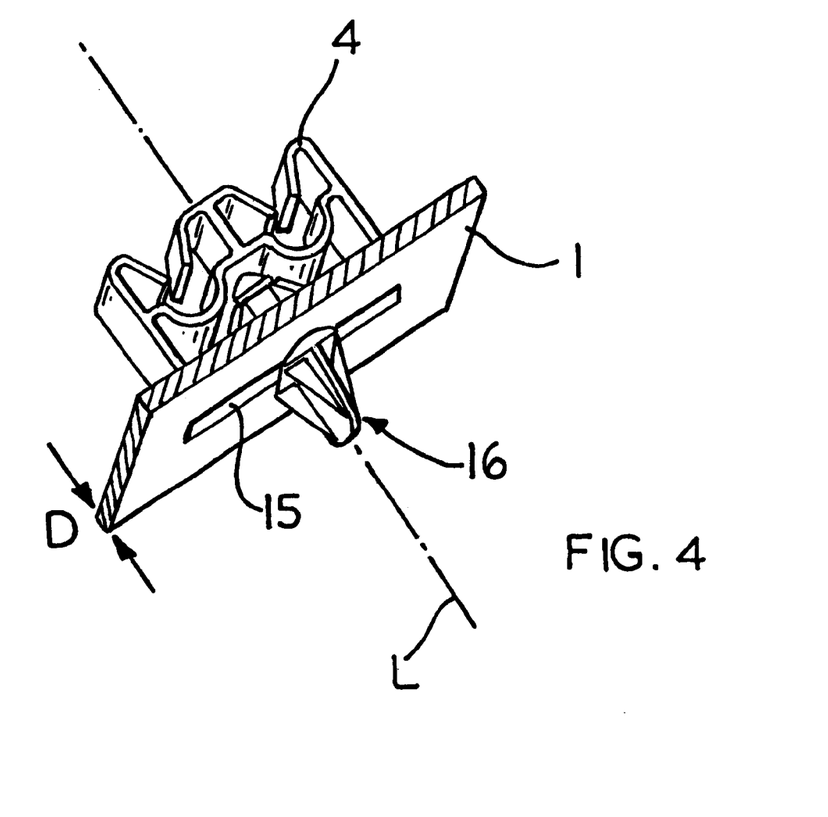
FIG. 4 is a perspective view of the clip arrangement taken from the bottom looking upwardly therefrom and showing a longitudinal axis "L"

The retaining part 3 is rotated through an angle of 90° about its longitudinal axis L in FIG. 4. As a result of the rotation and the non-circular shape of the opening 15 or of the projection 16, the clamping part 6, object 1 and retaining part 3 are fixed relative to one another. The spacing A between clamping part 4 and retaining part 3 is preferably smaller in design at least in a partial region than the thickness D of the object, so the object 1 is secured by clamping part 4 and retaining part 3 due to the elasticity of at least one of the components involved and is not loose. To release the connection, the retaining part 3 is, in turn, rotated through 90° so the projection 16 can be withdrawn through the opening 15.

Figure 5:
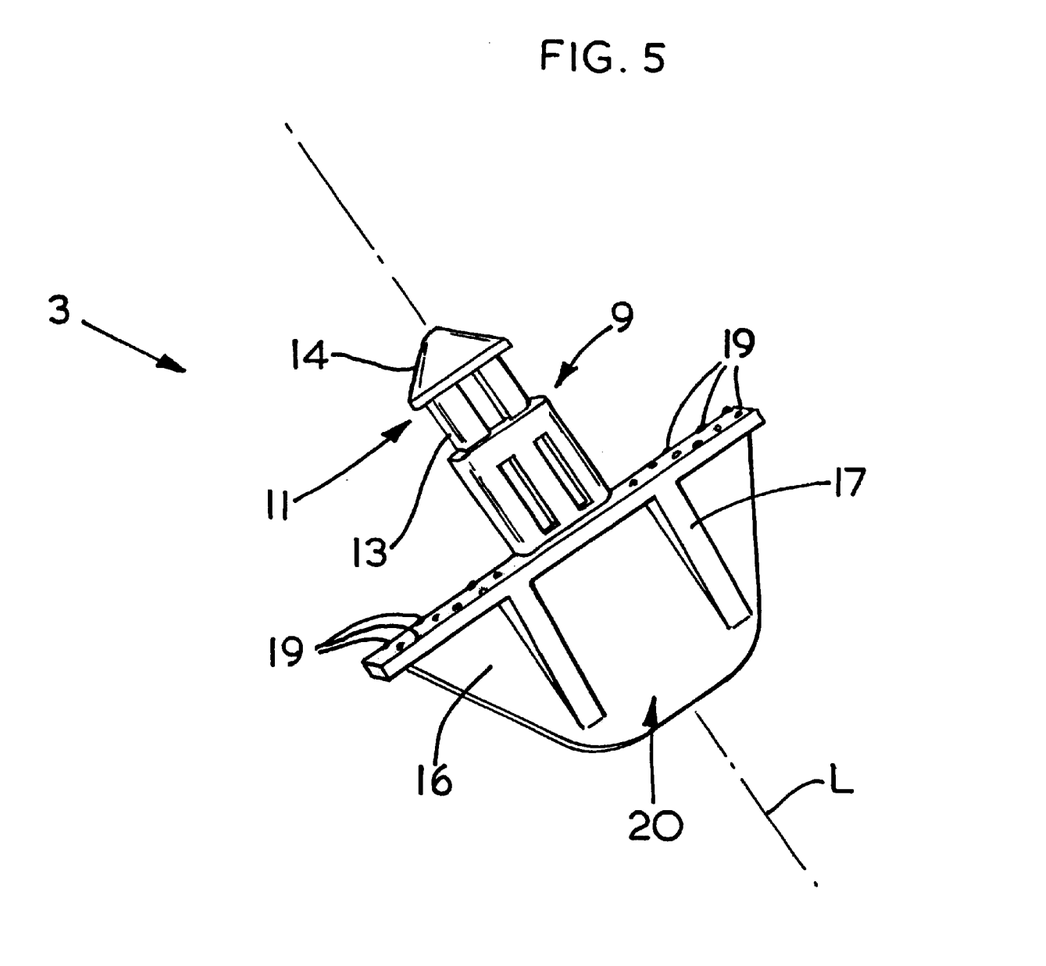
FIG. 5 shows a retaining part of the clip arrangement of the present invention.

FIG. 5 is a detailed view of the retaining part 3 with a journal 9, having a circular collar 14 at its upper end. The journal 9, in its cross-sectional plane perpendicular to the longitudinal axis, has a substantially square structure, the corners being formed by beads 13. The projection 16 is designed as a handle 20 and contains reinforcing structures 17 which ensure adequate stability when the retaining part 3 is turned. Friction structures 19, such as, for example pimples, small barbs or other rough elements, are applied to the projection 16 to increase friction. This prevents the retaining part 3 from being released automatically from the clamping part 4, for example under the influence of vibrations.

Figure 6:
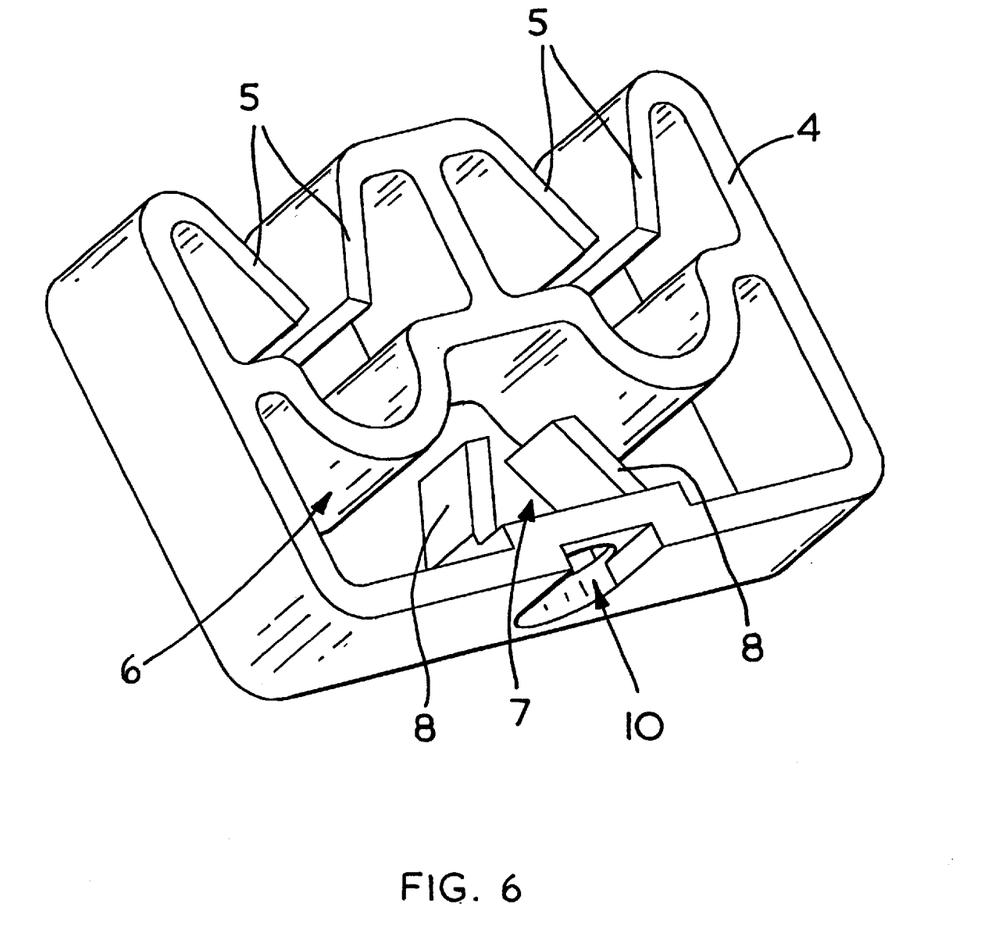
FIG. 6 shows a clamping part of the clip arrangement of the present invention.

FIG. 6 shows the clamping part 4 with its fastening structures 5 which allow robust fastening of the clamping part 4 to lines 2. Damping structures 6 decouple the object 1 from vibration in the lines 2. The damping structures 6 are formed by the construction of the clamping part 4 which allows elastic deformation of the clamping part 4. With the aid of the journal socket 10, a journal 9 can be received. Finger-like spring elements 8 on the one hand are used in cooperation with the cross-section of the journal 9, which is not round, as latching means 7 to provide certain stable angles of the clamping part 4 relative to the retaining part 3 on the one hand, and, on the other hand, ensure a rotatable connection between the clamping part 4 and retaining part 3 which has tensile strength at all angles, in cooperation with the bottom 11 of the collar 14.

As shown in the drawings, clamping part 4 (a clip) and the retaining part 3 (a retainer) constitute a device for fastening elongate articles (e.g., lines 2) to an object 1 (e.g., a panel) having an opening 15 therethrough. As is apparent in FIG. 6, for example, the clip 4 has a base with a hole 10 therethrough and has a structure extending from the base for holding the elongate articles. Finger-like spring elements 8 (spring fingers) extend from the base adjacent to the hole 10. The clip 4 may be a one-piece molding, in which the article-holding structure has a pair of arms extending from the base, and in which damping structures 6 are part of a bridge that extends between the arms of the clip and that form recesses to receive the articles 2, as shown in FIG. 1. Fastening members 5 retain the elongate articles 2 in the recesses.

The retainer 3 has a handle 16 and a journal 9 (shaft) that extends from the handle through the hole 10 in the base of the clip. As shown in FIGS. 2 and 5, the shaft 9 has a first part (adjacent to handle 16) that is rotatable in the hole 10, a second part, with beads 13, that cooperates with the resilient fingers 8 to provide different stable rotational positions of the retainer relative to the clip, and a third part (collar 14) with a shoulder 11 that engages ends of the spring fingers 8 to hold the clip on the retainer.

As shown in FIG. 2, the collar 14 is adjacent to the bridge, and the spring fingers B converge toward the collar. The second part of the shaft, between the spring fingers 8, may be non-circular in cross-section, such as a square configuration with beads 13 at the corners.

Figure 3:
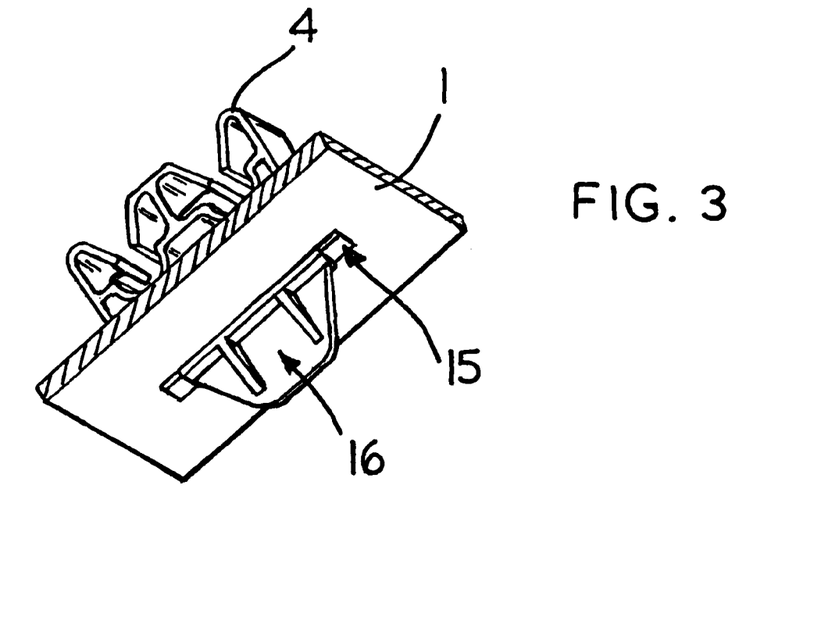
FIG. 3 is a perspective view of the clip arrangement taken from the bottom as shown in FIG. 4, which has been rotated 90° about the longitudinal axis "L" of FIG. 4.

As shown in FIGS. 3 and 4, the relative configurations of the slot 15 in the object 1 and the handle 16 are such that in one rotational position of the retainer the handle 16 can pass through the slot 15, and in another rotational position of the retainer the handle 16 is prevented from passing through the slot 15.

As shown in FIG. 2, the relationship of the clip 4 and the retainer 3 provides a space A between the clip and the retainer for receiving the object 1. The space A can be smaller than the thickness D of the object shown in FIG. 4, so that the object 1 can be clamped between the clip 4 and the retainer 3.

Figure 7:
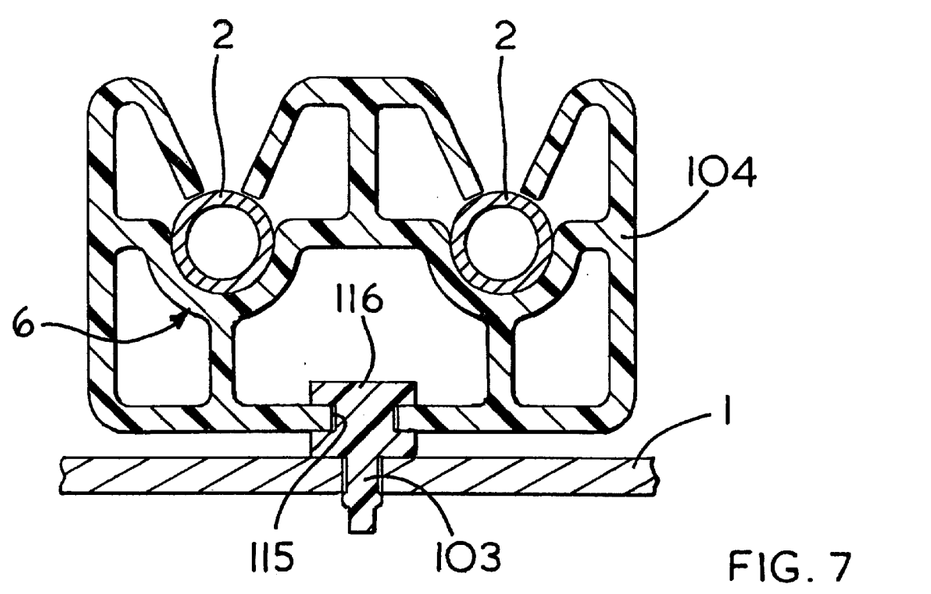
FIG. 7 is a sectional view of a clip arrangement of the present invention with the retainer thereof in an unreleased position.
Figure 8:
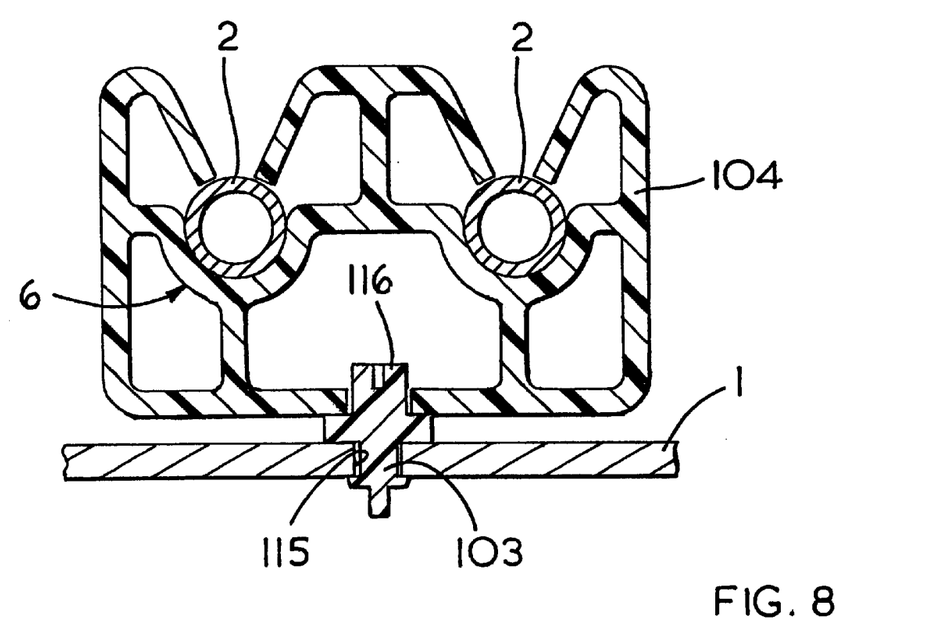
FIG. 8 is a sectional view of the clip arrangement of the present invention showing an alternate retainer thereof in a released position.

FIG. 7 and FIG. 8 are cross-sections in two positions of the retaining part 103 rotated through 90° of an alternative clip arrangement according to the invention, in which the object 1 is released from the line 2 in that there is a separation between the clamping part 104 and retaining part 103. The retaining part 103 can be permanently connected to the object 1 in this case.

The difference between FIG. 7 and FIG. 8 is that the retaining part 103 is rotated through 90°, so the non-circular projection 116 causes fastening by means of clamping to the non-circular opening 115 in FIG. 7, whereas the connection in FIG. 8 is releasable.

The invention is particularly suitable for fastening objects 1 to lines 2, high tensile strength being combined with simple releasability of the connection.

In general, the above identified embodiment is not to be construed as limiting the breadth of the present invention. It will be understood that modifications or other alternative constructions may become apparent within the scope of the invention as defined in the appended claims.

What is claimed is:

1. A device for fastening an elongate article to an object, comprising:
   a clip having a base adapted to be supported adjacent to the object and having a structure extending from the base for holding the elongate article, the base having a hole therethrough and having at least one spring finger extending from the base adjacent to the hole; and
   a retainer having a handle and a shaft extending from the handle through the hole in the base of the clip, the shaft having a first part rotatable in the hole, a second part that cooperates with the spring finger to provide different stable rotational positions of the retainer relative to the clip, and a third part that engages an end of the spring finger to hold the clip on the retainer.

2. A device according to claim 1, wherein the clip is a one-piece molding, and the article-holding structure has a pair of arms extending from the base, a bridge between the arms with a recess for receiving an elongate article therein, and a fastening member for retaining the elongate article in the recess.

3. A device according to claim 2, wherein the third part of the shaft comprises a collar adjacent to the bridge and having a shoulder adjacent to an end of the spring finger.

4. A device according to claim 2, wherein the clip has a pair of spring fingers that converge toward the collar, and wherein the cross-section of the second part of the shaft is non-circular.

5. A device according to claim 4, wherein the cross-section of the second part of the shaft is a square configuration with corners having beads.

6. In combination with a panel having a slot therethrough, a device for supporting at least one elongate article on the panel, said device comprising:
   a clip having a base adjacent to the panel and having a structure extending from the base for holding the elongate article, the base having a hole therethrough and having at least one spring finger extending from the base adjacent to the hole; and
   a retainer having a handle and a shaft extending from the handle through the hole in the base of the clip, the shaft having a first part rotatable in the hole, a second part that cooperates with the spring finger to provide different stable rotational positions of the retainer relative to the clip, and a third part that engages an end of the spring finger to hold the clip on the retainer, wherein the panel is disposed between the base of the clip and the handle, and wherein the relative shapes of the slot and the handle cooperate to permit the handle to pass through the slot in one rotational position of the retainer but to prevent the handle from passing through the slot in another rotational position of the retainer.

7. The combination of claim 6, wherein the retainer and the clip are constructed to provide a space between the handle and the base of the clip for receiving the panel therein.

8. The combination of claim 6, wherein the clip is a one-piece molding, and the article-holding structure has a pair of arms extending from the base, a bridge between the arms with a recess for receiving an elongate article therein, and a fastening member for retaining the elongate article in the recess.

9. The combination of claim 6, wherein the third part of the shaft comprises a collar adjacent to the bridge and having a shoulder adjacent to an end of the spring finger.

10. The combination of claim 6, wherein the clip has a pair of spring fingers that converge toward the collar, and wherein the cross-section of the second part of the shaft is non-circular.

11. The combination of claim 10, wherein the cross-section of the second part of the shaft is a square configuration with corners having beads.

* * * * *